United States Patent
Uchiyama et al.

(10) Patent No.: US 6,700,279 B1
(45) Date of Patent: Mar. 2, 2004

(54) BRUSHLESS MOTOR

(75) Inventors: Hidekazu Uchiyama, Miyagi-mura (JP); Yutaka Nozue, Gunma (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/019,349

(22) PCT Filed: Apr. 20, 2000

(86) PCT No.: PCT/JP00/02566

§ 371 (c)(1),
(2), (4) Date: Mar. 25, 2002

(87) PCT Pub. No.: WO00/64036

PCT Pub. Date: Oct. 26, 2000

(30) Foreign Application Priority Data

Apr. 20, 1999 (JP) .......................................... 11-112864

(51) Int. Cl.⁷ ................................................ H02K 1/27
(52) U.S. Cl. ...................................................... 310/190
(58) Field of Search .................. 310/190, 191, 310/209, 184, 178, 156, 198; H02K 1/27

(56) References Cited

U.S. PATENT DOCUMENTS

| 3,411,027 A | * 11/1968 | Rosenburg | 310/181 |
| 4,656,379 A | 4/1987 | McCarty | 310/181 |
| 5,574,342 A | * 11/1996 | Okamoto | 318/254 |
| 5,767,601 A | * 6/1998 | Uchiyama | 310/190 |

FOREIGN PATENT DOCUMENTS

| EP | 0 620 634 A1 | 10/1994 | |
| JP | 68-78072 | 5/1987 | .......... H02K/21/14 |
| JP | 62-147936 | 7/1987 | .......... H02K/21/00 |
| JP | 09-172760 | 6/1997 | .......... H02K/21/22 |
| JP | 10-178752 | 6/1998 | ............ H02K/1/27 |
| WO | WO 99/09638 | 2/1999 | |

OTHER PUBLICATIONS

Copy of Supplementary EPC Search Report for Ser. No. EP 00 91 9140 dated Aug. 9, 2002.

* cited by examiner

Primary Examiner—Karl Tamai
Assistant Examiner—Nguyen Hanh
(74) Attorney, Agent, or Firm—McCormick, Paulding & Huber LLP (57) ABSTRACT

The present invention has a stator 3 around which an armature coil 11 is wound, a rotor 5 rotatably arranged inside or outside the stator 3, ring magnets 24 and a sensor unit 25 for detecting positions of the rotor, a motor driver 31 for controlling current flowing into the armature coil 11 such that a rotating magnetic field is formed in accordance with rotating positions of the rotator. The rotator 5 has a field magnet on including a plurality of permanent magnets 9 magnetized at the same pole, and a plurality of control poles 10 made of a magnetic material and arranged between the permanent magnets 9. Further, a field coil 13 forming a closed magnetic path passing through the control poles 10 is provided in a side of the stator 3. By controlling directions and amounts of current flowing into the field coil 13, motor characteristics are controlled without reducing motor efficiency thereof.

3 Claims, 8 Drawing Sheets

BRUSHLESS MOTOR

CROSS-REFERENCE TO RELATED APPLICATIONS

This application is entitled to the benefit of and incorporates by reference essential subject matter disclosed in PCT Application No. JP00/02566 filed on Apr. 20, 2000, and Japanese Patent Application No. 11-112864 filed on Apr. 20, 1999 in the name of MITSUBA Corporation.

FIELD OF THE INVENTION

The present invention relates to a motor capable of changing characteristics thereof, and particularly to a technique effectively applicable to a brushless motor.

DESCRIPTION OF THE RELATED ART

Conventionally, in order to make current and/or commutation flow to an armature coil in a non-contact state by using semiconductor devices, a brushless motor is constructed such that an armature is used as a stator and a field magneton is used as a rotor. A magnet or electromagnet has been used as the field magneton. However, the field magnet on using a magnet has been mainly used because there is a need of making current and/or commutation flow in a non-contact state.

Figure 9:
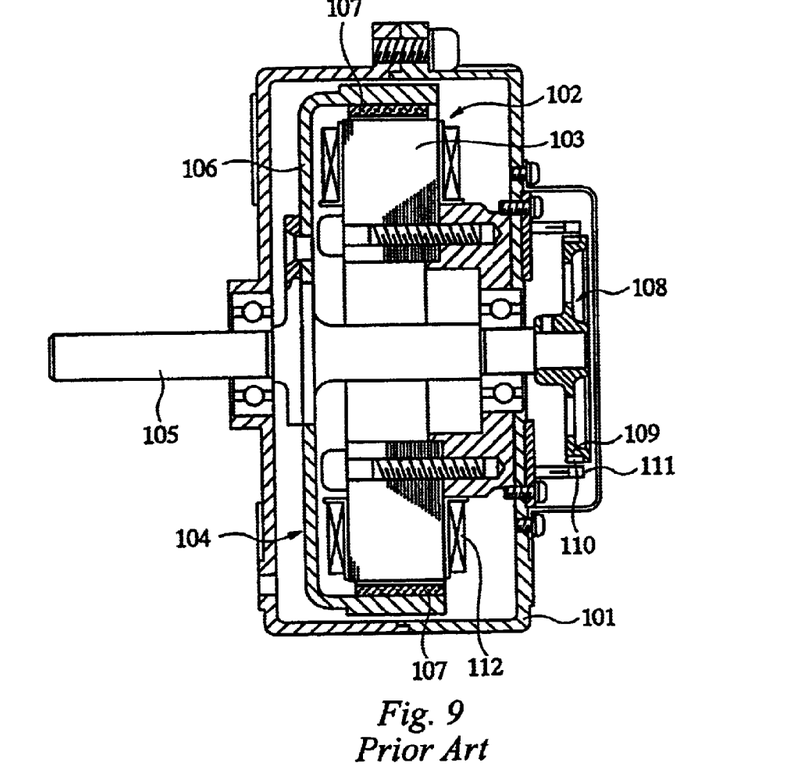
FIG. 9 is an explanatory view showing a constitution of a conventional brushless motor.

FIG. 9 is a view to explain a configuration of the above conventional brushless motor. An apparatus shown in FIG. 9 is a so-called outer-rotor type brushless motor. The brushless motor includes a stator 102 fixed to an end bracket 101, and a rotor 104 which is rotatably arranged over an outer periphery of a stator core 103 of the stator 102. The rotor 104 includes a bottomed cylindrical yoke 106 fixed to a rotor shaft 105, and magnets 107 arranged on an inner periphery of the yoke 106. These magnets 107 face the outer periphery of the stator core 103 via a predetermined air gap.

Further, the rotor 104 is provided with a sensor rotor unit 108 for detecting rotational positions thereof. In general, the sensor rotor unit 108 is constituted such that a ring magnet 110 is fixed to a sensor rotor 109 formed of non-magnetic materials (substances) such as aluminum, synthetic resin or the like. Contrary to this, a sensor unit 111 using Hall element or the like is provided at a position facing the ring magnet 110 in a side of the end bracket 101. In this case, the ring magnet 110 is magnetized up to the same number of (magnetic) poles as the magnets 107 of the rotor 104. Therefore, pole change in the ring magnet 110 is detected by the sensor unit 111, and thereby it is possible to know rotational positions of the rotor 104 rotating in a manner synchronous therewith.

On the other hand, a three-phase Y-connection motor winding (armature coil) 112 is wound around the stator core 103. Currents flow in each phase of the motor winding 112 in accordance with signals transmitted from the sensor unit 111 such that a rotating magnetic field is successively created from a driver circuit (not shown). By doing so, the rotor 104 is rotated over the periphery of the stator 102, and thereby the rotor shaft 105 is operated by rotation.

Figure 10:
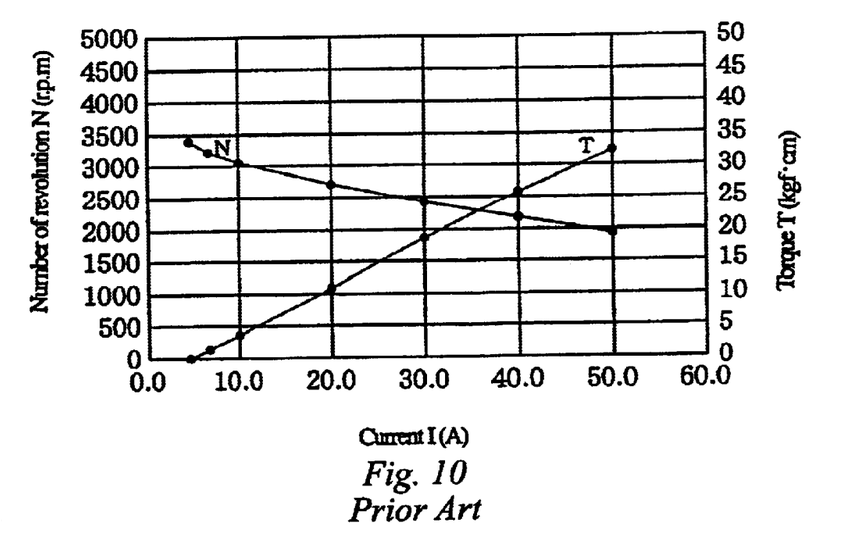
FIG. 10 is a diagram showing characteristics of the conventional brushless motor, and shows one example of characteristics of the case where a source supply voltage is 12V.

In this case, when a magnet is used as a magnetic field means, an effective magnetic flux is fixed in a magnetic circuit under the motor design. For this reason, motor characteristics are also specified at one kind in specifications of one winding in the case where a voltage is constant. FIG. 10 is a diagram showing characteristics of conventional brushless motor, and shows one example of characteristics of the case where a power-supply (source) voltage is 12V.

In FIG. 10, T means a motor torque, and N means the number of motor revolutions. As shown in FIG. 10, in the conventional brushless motor, if a voltage is kept constant, the torque and the number of revolution are uniquely determined. Thus, in the case of manufacturing appliances using the brushless motor, an operating point based on the above characteristics is determined.

In the case where the motor is used in a constant load state, there arises no problem even if the motor characteristics are fixed. However, in the case where the motor is effectively used under such a utilizing condition that the load state changes, there arise some disadvantage cases if the motor characteristics have been fixed.

For example, in a motor used for a small size electric vehicle, if it is assumed that the electric vehicle has no transmission for simplification, a "low-rotation and high-torque" type is desired as a motor characteristic at start and at ascent drive. However, since the upper limit of rotational speed is low under the type, the maximum speed is restricted low. On the other hand, if the winding specifications are varied to become a "high-rotation and low-torque" type, then this time ability to climbing ascents is reduced, current consumption required in start and in ascent drive increases. Further, current consumption in starting and hill climbing becomes much. That is, by a single motor, it is extremely difficult to simultaneously realize the above two motor characteristics under the condition of constant voltage and the same winding specifications. Further, in the case where the current, the torque and the number of revolution are not matched with appliances, there arises a requirement for establishing such a system that objects of the torque and the number of revolution are obtained by using not a single motor but a reduction gear or the like.

In recent years, a technique named a "weak field" has appeared, which has effects comparatively similar to the above both characteristics. According to the technique motor advances are electronically changed to realize variable characteristics. For example, in the case of a high-rotation and low-torque motor, angles of advance thereof are made large to change the motor characteristics. However, in this case, although the motor characteristics are certainly changed in a direction required for attaining the object, there is arises a problem of reduction of motor efficiency at the same time. Further, since providing a means for electronically changing the motor advance is needed, there arises a problem of high cost thereof.

On the other hand, in a brushless motor having field windings and using an electromagnet as a filed means, current application to field winding is controlled, and thereby, motor characteristics can be changed by controlling amounts of current flowing in the field windings. Therefore, the problem as described above is not so significant as a problem arising in the motor using a magnet as a field means. However, since all energies required for creating magnetic field depend upon a power supply, an occupation ratio of power required for the field magnetic out of input energies becomes great. Therefore, there arises a problem of reduction of the motor efficiency. In particular, influence thereof remarkably appears in a weak output motor, so that improvement thereof has been desired.

SUMMARY OF THE INVENTION

Accordingly, an object of the present invention is to provide a brushless motor that can change characteristics thereof without reducing a motor efficiency.

In order to achieve the above-mentioned object, a brushless motor of the present invention, having a stator around which an armature coil is wound; a rotor rotatably arranged inside or outside said stator; a rotor position detecting means for detecting a position of said rotor; and a current control means for making a current flowing into said armature coil such that a rotating magnetic field is formed between said armature coil and said rotor in accordance with a detected result of said rotor position detecting means, is characterized by a field magneton including a plurality of permanent magnets provided in said rotor and magnetized at the same pole, and a plurality of control poles made of a magnetic material and arranged between said permanent magnets; a field coil forming a closed magnetic path passing through said control poles; and a motor characteristic control means for changing a motor characteristic by controlling at least one of a direction and an amount of current flowing into said field coil, by changing a magnetic flux that said field coil generates, and by controlling an effective magnetic flux affected between said rotor and said stator.

Further, another brushless motor of the present invention, having a stator constituted such that an armature coil is wound around a stator core having a gap at a central portion thereof; a rotor made of a magnetic material and including a bottomed cylindrical yoke rotatably arranged outside said stator; a rotor position detecting means for detecting a position of said rotor; and a current control means for making a current flowing into said armature coil such that a rotating magnetic field is formed between said armature coil and said rotor in accordance with a detected result of said rotor position detecting means, is characterized by a field magneton including a plurality of permanent magnets provided in said rotor and magnetized at the same pole, and a plurality of control poles made of a magnetic material and arranged between said permanent magnets; a boss rotor made of a magnetic material, provided at the central portion of said rotor to project along an axial direction thereof, and arranged in said gap of said stator so as to have an air gap between said stator and the boss rotor, a field coil arranged in said stator so as to face a bottom portion of said yoke in a state of being wound in a surrounding direction of said boss rotor, and forming a closed magnetic path passing through said boss rotor, said yoke, said control poles and said stator core; and a motor characteristic control means for changing a motor characteristic by controlling at least one of a direction and an amount of current flowing into said field coil, by changing a magnetic flux that said field coil generates, and by controlling an effective magnetic flux affected between said rotor and said stator.

Further, another brushless motor of the present invention, having a stator including a stator core around which an armature coil is wound, and a bracket which holds said stator core and is made of a magnetic material; a rotor made of a magnetic material and including a rotor core rotatably arranged inside said stator; a rotor position detecting means for detecting a position of said rotor; and a current control means for making a current flowing into said armature coil such that a rotating magnetic field is formed between said armature coil and said rotor in accordance with a detected result of said rotor position detecting means, is characterized by a field magneton including a plurality of permanent magnets provided in said rotor and magnetized at the same pole, and a plurality of control poles made of a magnetic material and arranged between said permanent magnets; a magnetic path forming member made of a magnetic material, projected from said rotor core along a diametrical direction thereof, and arranged so as to have an air gap in the space of the stator with a gap between the stator and the magnetic path forming member; a field coil arranged in a side of said stator in a state of being wound in a surrounding direction of said rotor core, and forming a closed magnetic path passing through said rotor core, said control poles, said stator core, said bracket and said magnetic path forming member; and a motor characteristic control means for changing a motor characteristic by controlling at least one of a direction and an amount of current flowing into said field coil, by changing a magnetic flux that said field coil generates, and by controlling an effective magnetic flux affected between said rotor and said stator.

By the above-mentioned constitution, in the motor according to the present invention, it is possible to control widely characteristics thereof by controlling field current without changing winding specifications thereof under the same source supply voltage. Therefore, one motor can be used as a low-rotation and high-torque type or a high-rotation and low-torque type and, further, it is possible to achieve miniaturization of the motor, reduction of current consumption, improvement of degree of freedom in design, and the like.

The above and other objects and novel features will be more apparent from the following description of the present specification and the accompanying drawings.

DETAILED DESCRIPTION OF THE PREFERRED EMBODIMENT

Embodiments of the present invention will be in detail described below with reference to the accompanying drawings.

Embodiment 1

A first embodiment of the present invention will be in detail described below with reference to the accompanying drawings.

Figure 1:
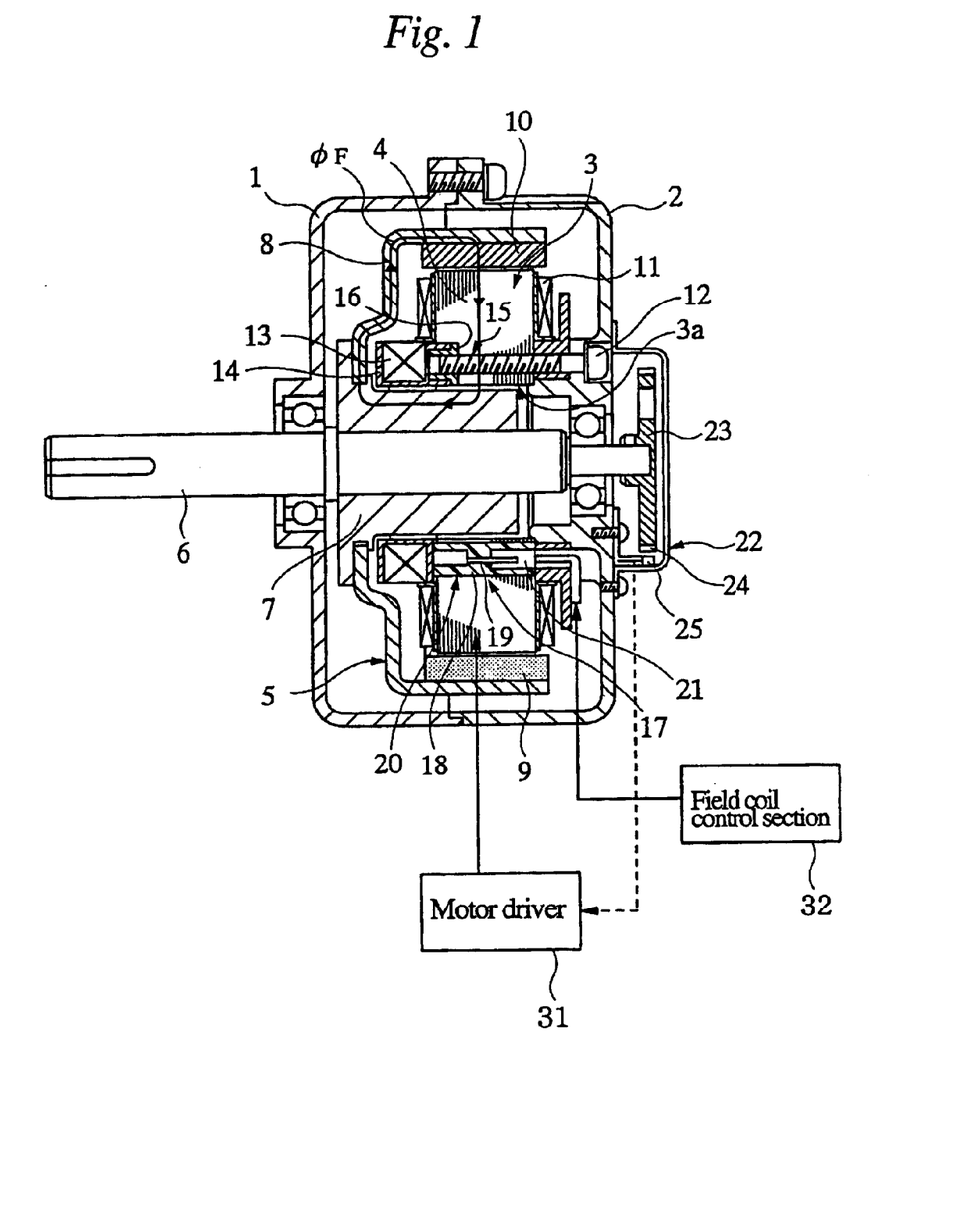
FIG. 1 is a front sectional view showing principal parts of a brushless motor that is Embodiment 1 of the present invention.
Figure 2:
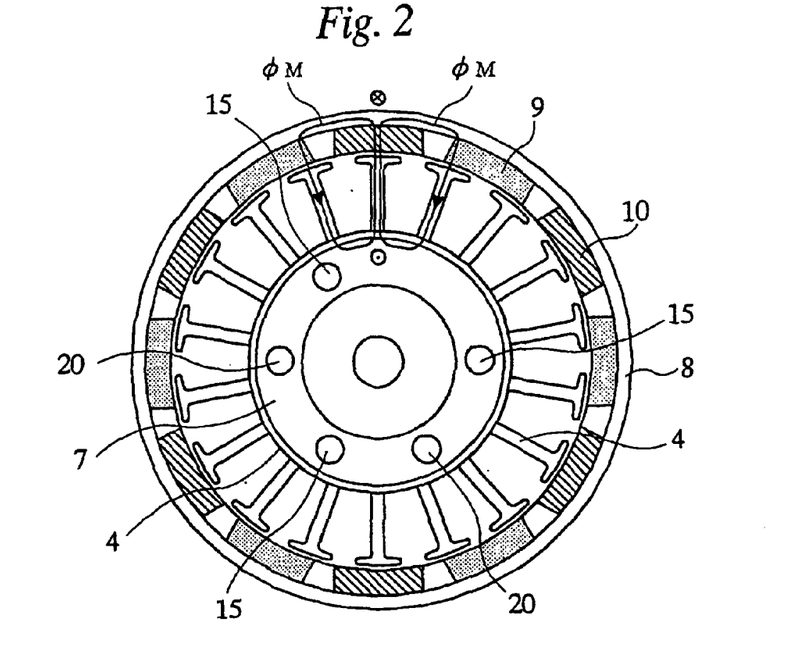
FIG. 2 is an explanatory view showing schematically an arrangement state of a rotor and a stator of the brushless motor shown in FIG. 1.

FIG. 1 is a front sectional view showing principal main sections of a brushless motor (hereinafter, referred simply to as a motor) that is Embodiment 1 of the present invention. FIG. 2 is an explanatory view schematically showing an arrangement state of a rotor and a stator in the brushless motor shown in FIG. 1.

A motor according to the present invention has a configuration of employing a hybrid magnetic field system in which permanent magnets used as field magnetons and control poles excited by field coils are arranged. By controlling directions and amounts of current flowing into the field coils, characteristics of each motor can be variously changed even if motors are operated in the same source supply voltages and/or are formed of the same winding specifications.

The motor of Embodiment 1 is constituted as a so-called outer rotor type brushless motor, as shown in FIG. 1. That is, the motor has a configuration in which a stator 3 and a rotor 5 are arranged in a front bracket 1 and an end bracket 2. The stator 3 is fixed to the end bracket 2, and the rotor 5 is rotatably provided over an outer periphery of a stator core 4 of the stator 3.

The rotor 5 includes a boss rotor 7 fixed to a rotor shaft 6 functioning as an output shaft, and a bottomed cylindrical yoke 8 attached to the boss rotor 7. The rotor shaft 6 and the yoke 8 are both formed of magnetic materials such as iron or the like. On an inner peripheral of the yoke 8, a plurality of magnets (permanent magnets) 9 is arranged along a circumferential direction thereof at predetermined intervals in the same pole magnetized state, for example, such that each N pole thereof comes in a side of an inner periphery thereof. Further, in the motor, a plurality of control poles 10 formed of magnetic materials is arranged between the magnets 9 along the circumferential direction, respectively. Each counter-pole (S pole) of the magnet 9 is constituted by each of the control poles 10. Namely, in the motor, the magnet 9 and the control poles 10 form a field magneton.

Therefore, in the motor, in order to use the control poles 10, it is possible to reduce the using number of magnets 9, and to achieve much lower costs in comparison with all-magnet type motors. On the other hand, in comparison with all-field coil type motors, the motor having high efficiency can be realized, particularly, in small output motors, because the magnets take charge of amounts corresponding to field input thereof.

The stator 3 is constituted such that an armature coil 11 is wound around the stator core 4 in a three-phase Y-connection state, and is formed in a donut shape as a whole. Further, the stator 3 is arranged in the brackets 1 and 2 to be concentric with the rotor 5, and is fastened to the end bracket 2 by bolts 12. The armature coil 11 is connected to a motor driver (current control means) 31 by lead wires (not shown). In each phase of the armature coil 11, current flows such that rotating magnetic fields are successively formed between the stator 3 and the rotor 5 in accordance with a signal from a sensor unit described in detail below.

The stator 3 is provided with a gap portion 3a in an inner peripheral surface side thereof, and the boss rotor 7 of the rotor 5 is inserted therein in such a state that an air gap is formed between the inner peripheral surface of the stator 3 and the boss rotor 7. The outer peripheral surface of the stator 3 faces respective inner peripheral surfaces of a group of the magnets 9 and the control poles 10 of the rotor 5 via a predetermined air gap. That is, the rotor 5 is fixed to the rotor shaft 6 in such a state that the boss rotor 7 placed at a center portion thereof is inserted into a center portion of the stator 3. The rotor 5 is constituted such that the group of the magnets 9 and the control poles 10 can be rotated around the outer periphery of the stator 3.

The stator 3 is provided with a field coil 13 so as to surround the boss rotor 7 at an end face opposite to a bottom wall of the yoke 8. The field coil 13 is wound around a bobbin which is formed of non-magnetic materials such as resin or of magnetic materials such as iron or the like. In this case, a magnetic flux generated by the field coil 13 concentrates on the control poles 10 having a low magnetic resistance rather than the magnet 9 having a low permeability. For this reason, by flowing current, the field coil 13 forms a closed magnetic path composed of the boss rotor 7→the yoke 8→each control pole 10→the stator core 4→the boss rotor 7.

That is, in the motor, a loop shown by $\phi_F$ in FIG. 1 is formed by the field coil 13. Further, a magnetic loop shown by $\phi_M$ in FIG. 2 is formed by the magnets 9. The above loops thus formed do not basically interfere with each other because each loop surface thereof is perpendicular to each other. However, because of a relation between respective permeances of elements of the magnetic path, the control poles 10 and the stator core 4 facing thereto form a joined magnetic path. Namely, an effective magnetic flux affecting to the armature coil 11 is a magnetic flux combining a magnetic flux induced by the magnets 9 and a magnetic flux induced by the field coil 13, with each other.

In the motor of the present invention, by changing directions and amounts of current flowing into the field coil 13 and an amount of current, directions and amounts of magnetic flux generated therein are changed, and further. Therefore, directions and amounts of magnetic flux conducted through combining portions of both the magnetic paths are changed. And, this changes an effective magnetic flux between the rotor 5 and the stator 3, and, thereby, properly controls characteristics of the motor.

The field coil 13 is wound around a coil bobbin 14. The coil bobbin 14 is attached to the stator 3 by bolts 12. In this case, the stator core 4 of the stator 3 is provided with a plurality of bolt insertion holes 15, each of which is spaced in the circumferential direction thereof so as to axially pass through. On the other hand, a plurality of nut portions 16 are provided so as to correspond to the bolt insertion holes 15 at a right-hand end face of the coil bobbin 14 of the field coil 13 as shown in FIG. 1. The bolts 12 are inserted into the bolt insertion holes 15 from the outside of the end bracket 2 and then are screwed into each nut portion 16. Thereby, the field coil 13 is fastened to the end bracket 2 together with the stator 3.

A feeder section 17 is provided at a part of the coil bobbin 14 of the field coil 13. The feeder section 17 has a rod-like holder 18 formed of a resin with insulative properties, and a male terminal member 19 electrically connected to the field coil 13. The male terminal member 19 is axially inserted into and held in the holder 18. By inserting the holder 18 into a feeder section insertion hole 20 formed in the stator core 4, the male terminal member 19 is drawn in a side of the end bracket 2 in the stator 3, and is electrically connected to a female terminal member 21 therein. The female terminal member 21 is electrically connected to a field coil control section 32 functioning as a motor characteristic control means.

Thus, amounts of current flowing into the field coil 13 is controlled by the field coil control section 32 via the respective terminal members 19 and 21. By controlling the flowing amounts of current, the above-mentioned magnetic flux created by the field coil 13 changes and the excitation state of each control pole 10 changes. Therefore, an effective magnetic flux between the rotor 5 and the stator 3 is controlled.

Further, the rotor 5 is provided with a sensor rotor unit 22 for detecting rotational positions thereof. The sensor rotor unit 22 is constituted such that ring magnets 24 are attached to a sensor rotor 23 made of aluminum. The ring magnets 24 are magnetized to the same number of magnetic poles as the magnets 9 of the rotor 5. On the other hand, in the side of the end bracket 2, a sensor unit 25 using Hall element is provided on a position facing the ring magnets 24. The sensor unit 25 detects change in respective magnetic poles of the ring magnets 24, and thereby it is possible to detect rotational positions of the rotor 5 rotating together with the ring magnets 24.

Subsequently, an explanation will be made of characteristics of the motor shown in FIG. 1. First, in the case of driving the motor, a driving signal is transmitted to the armature coil 11 of the stator 3 from the motor driver 31. Then, the rotor 5 is rotated by an interaction between a rotating magnetic field created by current flowing into this armature coil 11 and a magnetic field generated by a group of the magnets 9 and the control poles 10 of the rotor 5. In this case, positions of the rotating rotor 5 are hourly measured by detecting positions of the ring magnets 24 by the sensor unit 25. Since the detected information is transmitted to the motor driver 31, the motor driver 31 continuously and stably can rotate the rotor 5.

Figure 3:
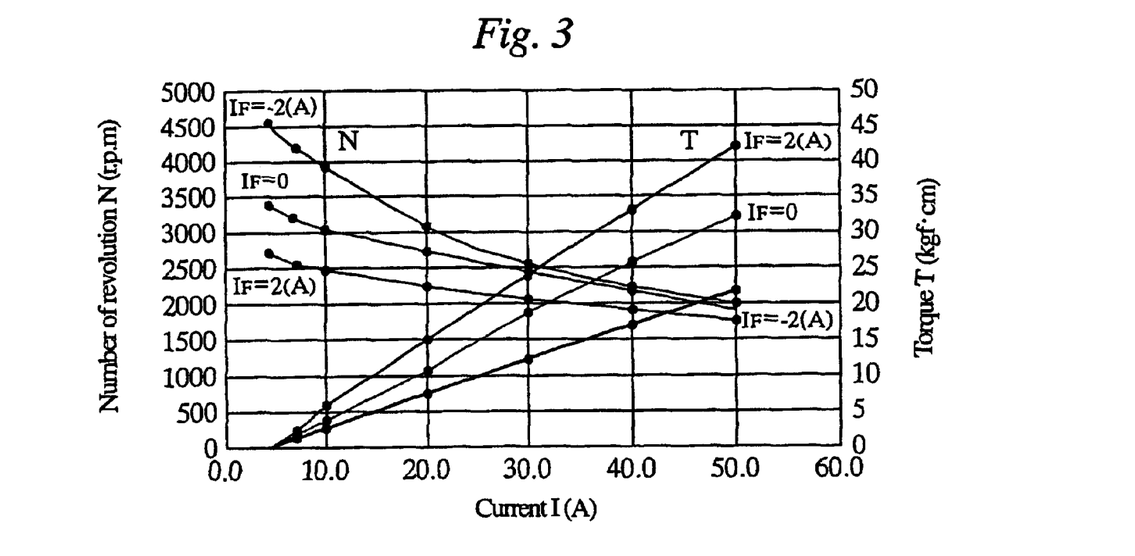
FIG. 3 is a diagram showing one example of motor characteristics of the brushless motor shown in FIG. 1.

Then, in the above-mentioned motor, by controlling directions and amounts of current flowing into the field coil 13, the characteristics of the motor can be properly changed. FIG. 3 is a diagram showing one example of characteristics of the motor shown in FIG. 1. In FIG. 3. a reference numeral $I_F$ denotes a value of current flowing in the field coil 13. Sign thereof means respective excited directions of the control poles 10. Plus sign (+) means that field current flows in such a direction as to have a pole different from each pole of the magnets 9 by the control poles 10. Minus sign (−) means that field current flows in such a direction as to have the same pole as each pole of the magnets 9 by the control poles 10.

As shown in FIG. 3, in the motor, the motor characteristics can be continuously changed between "low- rotation and high-torque type" and "high-rotation and low- torque type". Namely, it is possible that the present invention utilize means in which the motor is started up in a state of $I_F=2(A)$ at start-up and gains a torque, and which the motor is shifted to a state of $I_F=0$ to $−2(A)$ after the start-up and gains the number of revolution thereof.

In this case, when $I_F=0$, a pole opposite to a magnetic pole of each magnet 9 appears in each control pole 10. The N and S poles as a magnetic flux source using only magnets 9 are alternately arranged on the inner peripheral side of the rotor 5. Then, the above-mentioned magnetic loop $\phi_M$ conducted by each magnet 9 affects the armature coil 11. On the contrary, when $I_F=2(A)$, current flows into the field coil 13 such that the control poles 10 lead to a state having a magnetic pole different from the pole of the magnets 9. Then, the N and S poles formed by overlap of magnetic fluxes conducted from the magnets 9 and the field coil 13 are alternately arranged on the inner peripheral side of the rotor 5. Thus, the effective magnetic flux affecting the armature coil 11 increases, and current flows into the motor in such a state that the effective magnetic flux is much, so that the generated torque increases. Accordingly, in the case where a great torque is required at start-up, it is possible to operate the motor in a state capable of generating a desired torque.

On the other hand, if a flowing direction of $I_F$ is changed, a direction of magnetic flux passing through the control poles 10 is inverted. In the control poles 10, as described above, the magnetic fluxes from the magnets. 9 and from the field coil 13 are combined with each other. Thus, when the amounts of magnetic flux conducted by the field coil 13 exceed the amounts of magnetic flux conducted by the magnets 9, the control poles 10 and the magnets 9 exhibit the same polarity.

For this reason, when $I_F=−2(A)$, the control poles 10 become the same magnetic pole state as the magnets 9, and one pole having different strength is arranged on the inner peripheral side of the rotor 5. Therefore, the effective magnetic flux decreases, and current flows into the motor in such a state that the effective magnetic flux is little, and the generated torque is reduced. By this, it is possible to achieve an operation preceding the number of revolution rather than the torque and to thereby realize a high rotating operation not capable of being attained in the lower-rotation and high-torque type motor.

As described above, in the above-mentioned motor, if it is assumed that a motor characteristic is a basis thereof at zero ($I_F=0$) of the field current, then it is possible to widely control the motor characteristic in accordance with flowing directions and strengths of the field current slightly applied to the field coil 13.

Now, as a load to the motor shown in FIG. 1, for example, a torque of 15 kgf·cm is required at start-up, and it is preferable that a torque value is 5 kgf·cm or more after the start-up. However, it is assumed that there is a torque requiring the revolutionary number of 3000 rpm. In this case, when the motor is started up by applying a current of $I_F=2(A)$ to the field coil 13, it can be seen from FIG. 3 that a required torque is obtained without applying a current of 20(A) to the armature coil 11. However, if the motor is started up by using only the magnets 9 without using the control poles 10, as seen from FIG. 3, then a motor current of about 25(A) is required from the diagram of $I_F=0(A)$ shown in FIG. 3. Namely, by the interaction between the field coil 13 and the control poles 10, a current of 3(A) is reduced even if current required for the field coil 13 is considered.

Next, after the motor is started up, even if the number of revolution is increased up to 3000 rpm, then this can not be achieved when the current value is $I_F=2(A)$. For this reason, if a direction of current flowing into the field coil 13 is inverted to have a current of $I_F=−2(A)$, then it can be seen that the revolutionary number of 3000 rpm is obtained while a torque of 5 kgf·cm is ensured. In this case, even if the motor is started up by using only the magnets 9 without using the control poles 10, it is possible to obtain the revolutionary numbers of 3000 rpm but the required torque can not be ensured.

As described above, according to the motor of the present invention, conventional problems that can not solve a large load change by using a single motor can be dealt with only by the above-mentioned motor without using a transmission or the like and increasing an output. Further, it is possible to lessen change in load current generated by the load change, and to enlarge a range of the revolutionary numbers available and the like. Therefore, the motor of the present invention can be applied in a greatly wide range.

Embodiment 2

Figure 4:
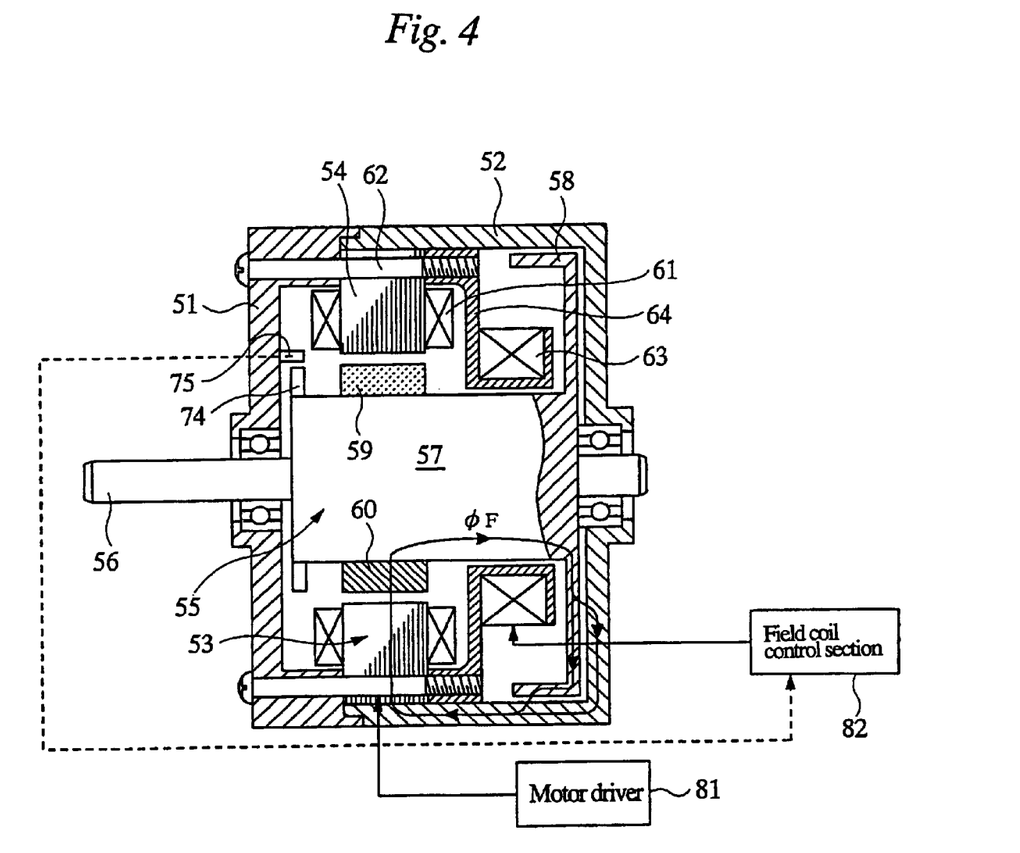
FIG. 4 is a front sectional view showing principal parts of a brushless motor that is Embodiment 2 of the present invention.
Figure 5:
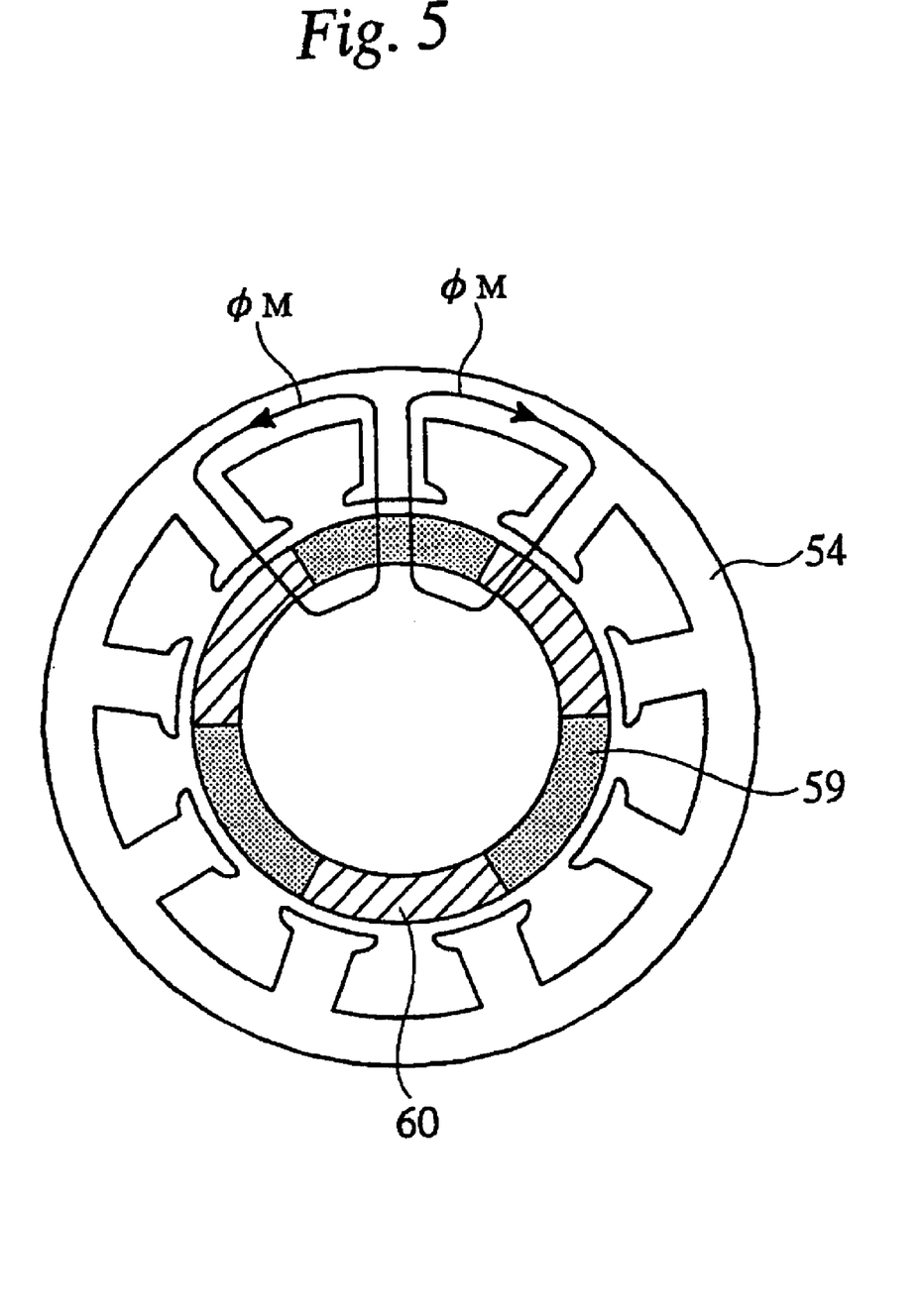
FIG. 5 is an explanatory view showing schematically an arrangement state of a rotor and a stator of the brushless motor shown in FIG. 4.

Next, description will be made of an inner rotor type brushless motor to which the present invention is applied as Embodiment 2. FIG. 4 is a front sectional view showing principal parts of a brushless motor (hereinafter, referred simply to as motor) that is Embodiment 2 of the present invention. FIG. 5 is an explanatory view schematically showing an arrangement state of a rotor and a stator in the brushless motor shown in FIG. 4. In Embodiment 2, the same name is given to the same member as Embodiment 1 described above, and a detailed explanation thereof will be omitted.

The motor of Embodiment 2 is constituted such that a stator 53 fixed to a rear bracket 52, and a rotor 55 rotatably provided in a side of an inner surface of a stator core 54 of the stator 53 are arranged in a front bracket 51 and a rear bracket 52. The front bracket 51 is made of non-magnetic materials such as aluminum or the like. The rear bracket 52 is made of magnetic materials such as iron or the like.

The rotor 55 has a rotor core 57 formed integrally with a rotor shaft 56 functioning as an output shaft, and a cylindrical magnetic path induction section (magnetic path forming member) 58 formed in a right-hand side of the rotor core 57 shown in FIG. 4. The rotor core 57 and the magnetic path induction section 58 are both formed of magnetic materials such as iron or the like. Further, on an inner periphery of the rotor core 57, a plurality of magnets (permanent magnets) 59 is arranged on a circumferential direction thereof at a predetermined interval in the same pole magnetized state, for example, such that the N pole comes up to an outer peripheral side thereof. Furthermore, in the motor, a plurality of control poles 60 formed of magnetic materials is arranged between these magnets 59 along the circumferential direction thereof.

The stator 53 is constituted such that an armature coil 61 is wound around the stator core 54 in a three-phase Y-connection state. In Embodiment 2, the stator core 54 is formed to have 9 poles. Further, the stator 53 is arranged to be concentric with the rotor 55 inside the brackets 51 and 52, and is fastened to the front bracket 51 by bolts 62. The armature coil 61 is connected to a motor driver (a current control means) 81 by lead wires (not shown). Current flows into each phase of the armature coil 61 in accordance with signals generated from a sensor unit such that a rotating magnetic field is successively formed between the stator 53 and the rotor 55.

The rotor core 57 of the rotor 55 is inserted into the inner peripheral surface side of the stator 53. The inner peripheral surface of the stator 53 faces an outer peripheral surface of a group of the magnets 59 and the control poles 60 of the rotor 55 via an air gap. That is, with the rotor 55 inserted into a center portion of the stator 53, the group of the magnets 59 and the control poles 60 are constituted to be rotatable inside the stator 53.

In a side of the rear bracket 52 at an end surface of the stator 53, a field coil 63 which is wound around a bobbin made of non-magnetic materials such as resin or the like is provided so as to surround the rotor core 57. In this case, the field coil 63 is held by a coil bracket 64, and is fixed to the front bracket 51 by bolts 62 via the stator core 54.

By the field coil 63, a closed magnetic path $\phi_F$ composed of the rotor core 57→the control poles 60→the stator core 54→the rear bracket 52→the magnetic path induction section 58 is formed. Thus, an effective magnetic flux combining a magnetic flux conducted from the magnets 59 and a magnetic flux conducted from the field coil 63 affects the armature coil 61.

Even in the motor, directions and amounts of current flowing in the field coil 63 are changed by a field coil control section 82 functioning as a motor characteristic control means. Thereby, amounts of effective magnetic flux between the rotor 55 and the stator 53 change, and the motor characteristics can be properly controlled.

Moreover, to the rotor 55, ring magnets 74 for detecting rotational positions thereof are attached. The ring magnets 74 are magnetized to have the same number of magnetic poles as the magnets 59 of the rotor 55. On the other hand, in a side of the front bracket 51, a sensor unit 75 using Hall elements is provided at a position facing the ring magnets 74. By detecting magnetic pole change in each ring magnet 74 by this the sensor unit 75, it is possible to detect rotational positions of the rotor 55 rotating together with the ring magnets 74.

Next, description will be made of characteristics of the motor shown in FIG. 4 and FIG. 5. First, in the case of driving the motor, a driving signal is transmitted to the armature coil 61 of the stator 53 from the motor driver 81. Then, the rotor 55 is rotated by an interaction between a rotating magnetic field induced by current flowing in the armature coil 61 and a magnetic field induced by the group of the magnets 59 and the control poles 60 of the rotor 55. In this case, positions of the rotating rotor 55 are hourly measured by the sensor unit 75, and the motor driver 31 rotates the rotor 5 in accordance with information thereof.

Figure 6:
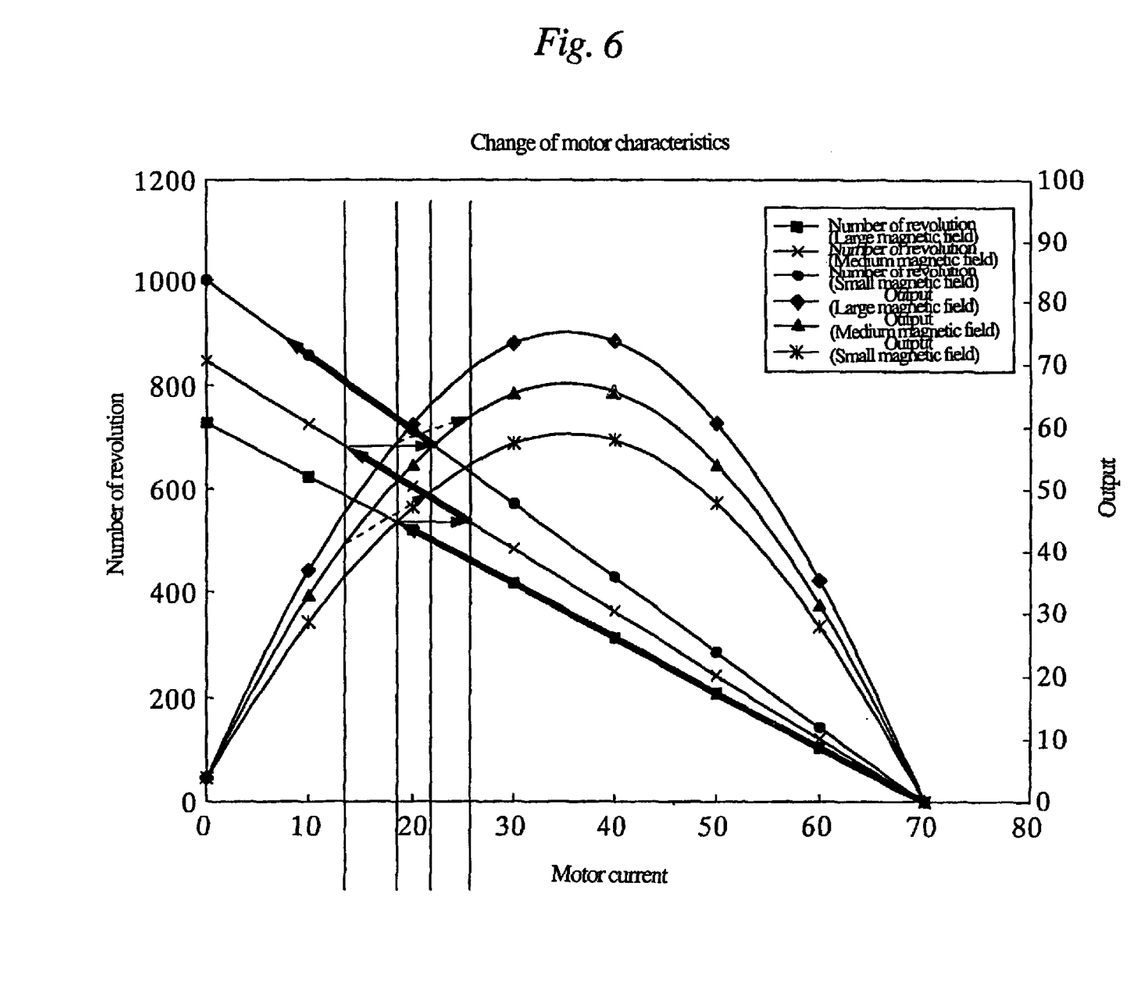
FIG. 6 is a diagram showing one example of motor characteristics of the brushless motor shown in FIG. 4, and shows a relation between motor current, number of revolution, and output.
Figure 7:
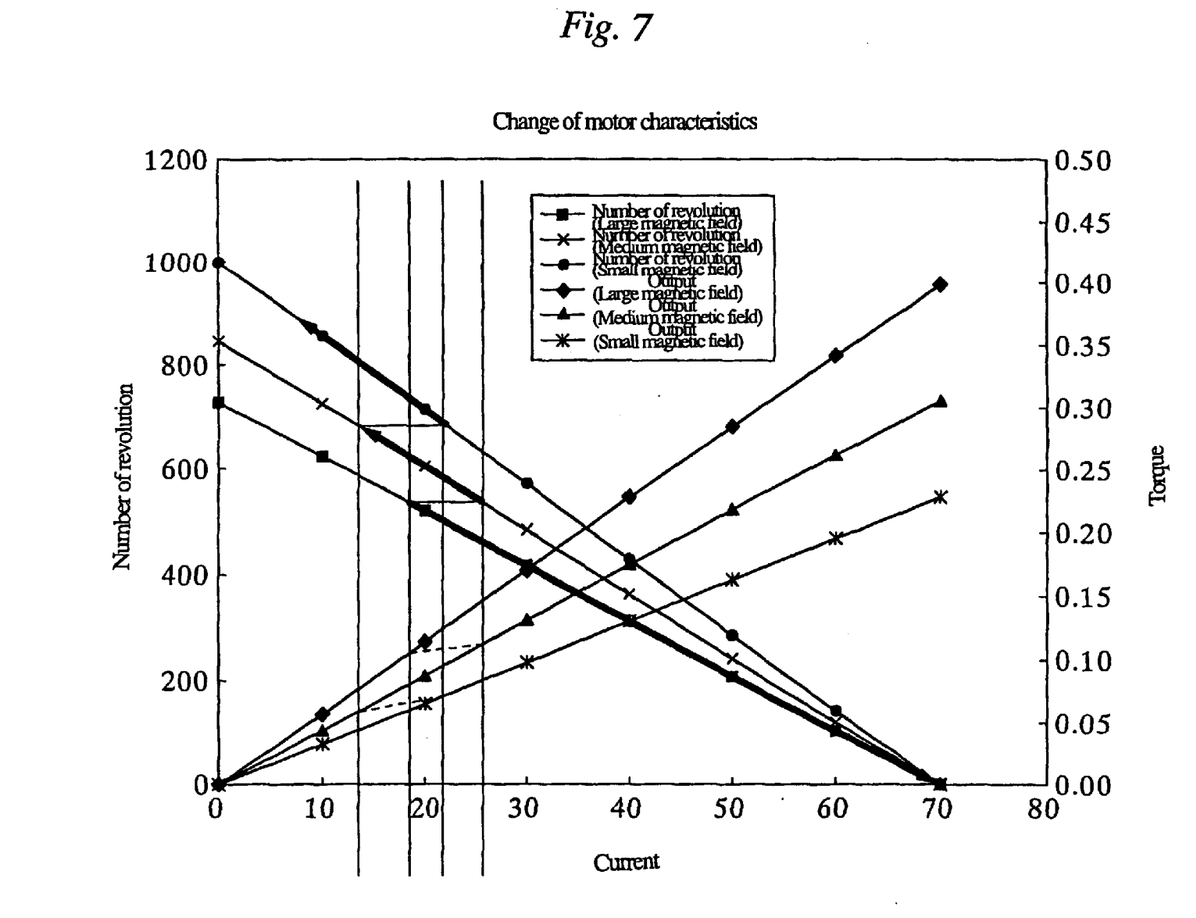
FIG. 7 is a diagram showing one example of motor characteristics of the brushless motor shown in FIG. 4, and shows a relation between motor current, number of revolution, and torque.

Even in the above-mentioned motor, by controlling the directions and amounts of current flowing in the field coil 63, the motor characteristics can be properly changed. FIG. 6 and FIG. 7 are diagrams showing one example of characteristics of the motor shown in FIG. 4 and FIG. 5. FIG. 6 shows a relation between motor current, number of revolution, and output. FIG. 7 shows a relation between motor current, number of revolution, and torque.

As shown in FIG. 6 and FIG. 7, even in the motor of Embodiment 2, the motor characteristics can be continuously changed between "low-rotation and high-torque type" and "high-rotation and low-torque type". In this Embodiment 2, the directions of current flowing in the field coil 63 are unchanged, and the amounts of current flowing therein are changed as "large⇌medium⇌small" to change the magnetic flux induced by the field coil 63. In these figures, the expression "large magnetic field" means corresponding to a magnitude of the amounts of current flowing in the field coil 63.

As is seen from FIG. 6 and FIG. 7, in the case of "large magnetic field", the motor of this Embodiment 2 functions as a low-rotation and high-torque (high output) type motor. Further, as the current flowing in the field coil 63 is made small ("medium magnetic field" or "small magnetic field"), the motor characteristics thereof is changed to a high-rotation and low-torque (low output) type motor. Thus, even in the above-mentioned motor, it is possible to obtain methods available for gaining of the torque by being started up in a "large magnetic field" state at start-up, and gaining of the torque by transforming a "medium magnetic field" state into a "small magnetic field" state after the start-up.

For example, as shown in FIG. 6 and FIG. 7, the motor is set to a state of "large magnetic field" (characteristics shown by the lowest line among lines indicative of the number of revolution) within a range from the start-up (the number of revolution is zero) to the predetermined number of revolution (e.g., 550 rpm). By doing so, it is possible to operate the motor with high-torque and high-output (characteristics shown by the highest line among lines indicative of torque and output).

Next, when the number of revolution exceeds a predetermined value or more, a value of the current flowing in the field coil 63 is made small, that is, is changed to medium. By doing so, as described in Embodiment 1, amounts of magnetic flux induced from the field coil 63 decrease, and magnetic force of the control poles 60 is weakened, and the effective magnetic flux affecting the armature coil 61 is reduced. Therefore, the motor characteristic is shifted to the line indicative of a "medium magnetic field" state in FIG. 6 and FIG. 7, and thus is changed into a high-rotation and low-torque side.

In an operation of "medium magnetic field", when the motor reaches the predetermined number of revolution (e.g., 650 rpm), a value of the current flowing in the field coil 63 is further made small. By doing so, the effective magnetic flux affecting the armature coil 61 further decreases, and the motor characteristic is shifted to the line indicative of a "small magnetic field" state, and the motor functions as a high-rotation and low-torque type motor. In these figures, the motor characteristic is described to directly shift between the lines. However, of course, by gradually changing amounts of field current, the motor characteristics can be controlled to continuously change.

Figure 8:
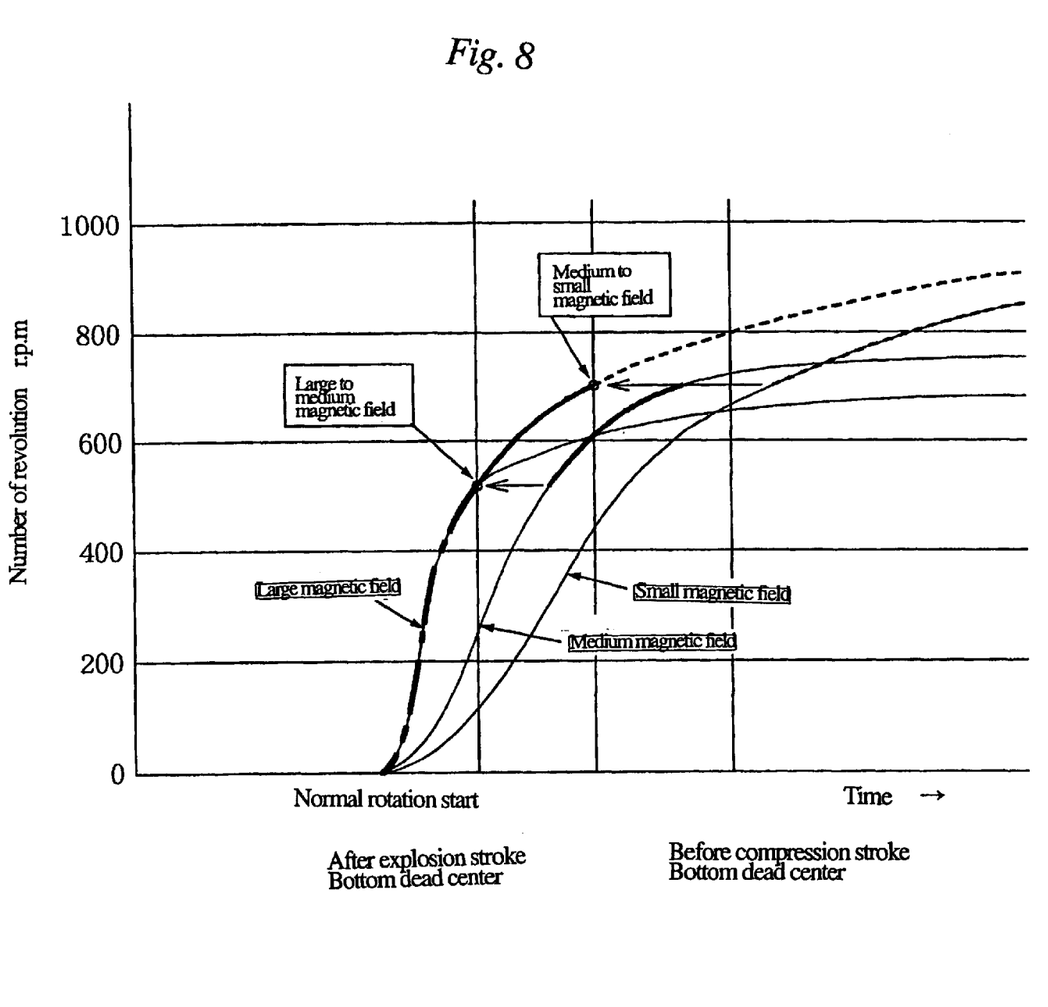
FIG. 8 is an explanatory view showing motor characteristics of the case where the brushless motor of the present invention is used as a starter motor for two-wheeled vehicle engine.

Meanwhile, the motor of the present invention having the above-mentioned characteristics is usable as a starter motor for two-wheeled vehicle engine, for example. FIG. 8 is an explanatory view showing motor characteristics in the case where the above-mentioned motor has been used as a starter motor for two-wheeled vehicle engine. In this case, it is assumed that the motor of Embodiment 1 is used. However, of course, the motor of Embodiment 2 may be used.

In the two-wheeled vehicle engine, a load thereof becomes the maximum when exceeding a compression stroke at start-up. Accordingly, it is desired that the starter motor increase a crankshaft of engine up to as high the number of revolution as possible from the motor start-up to the first exceeding thereof. Then, relative to the conventional motor, although the rise-up is satisfied in a low-rotation and high-torque type, the number of revolution does not increase thereafter. On the other hand, since the rise-up is not satisfied in a high-rotation and low-torque type, it is impossible to increase the number of revolution up to the exceeding thereof.

In view of the above situation, if the motor according to the present invention is applied as the starter motor, the motor rises up quickly in a low-rotation and high-torque type. Thereafter, it is possible to achieve such a control that the number of revolution in a high-rotation and low-torque type is enhanced as much as possible. More specifically, as shown in FIG. 8, first, the motor is started up in a "large magnetic field" state (shown by a dash and dotted line of FIG. 8). Then, the above state is shifted to a "medium magnetic field" state before the number of revolution in a low-rotation and high-torque type becomes a saturated state. Thereafter, when the number of revolution is enhanced (as shown by a solid and bold line of FIG. 8) in a "medium magnetic field" state and becomes a saturated state, the present state is shifted to a "small magnetic field" state and the motor is changed into a high-rotation type (as shown by a dotted line of FIG. 8).

By this, rotation of crankshaft rises up quickly by the high-torque type motor and, thereafter, it is possible to enhance the number of revolution of the crankshaft up to the maximum by the high-rotation type motor. Therefore, it is possible to properly deal with the first exceeding of the compression stroke by making energy thereof maximum and to realize an ideal engine start-up control by a small-size motor.

The present invention is not limited to the above-mentioned embodiments, and, needless to say, may be variously changed and modified without departing from the gist thereof.

For example, a value of the field current described in Embodiment 1, or control timing of the field change described in Embodiment 2, or the like is only one example, and, needless to say, the present invention is not limited to the above examples. More specifically, as a condition of the field change, only the number of revolution but also a ratio of change in the number of revolution, a load torque, a switch of change, or the like may be used.

Further, as one applied example of the motor that is the present invention in FIG. 8, there has been shown the starter motor for two-wheeled vehicle engine. However, an applicable object thereof is not limited to this starter motor. For example, the present invention is applicable to a blower motor used by change of speed thereof, an actuator for actuating a mechanism at a constant rotation relative to torque change, a motor car such as a golf cart changing both speed and load, or a prime mover motor used for electric vehicles or the like.

INDUSTRIAL APPLICABILITY

In the brushless motor of the present invention, as field magnetons, control poles made of magnetic materials is arranged and a field coil forming a closed magnetic path passing through the control poles is provided, between the same pole magnetized permanent magnets. By controlling directions and amounts of current flowing in the field coil, the effective magnetic flux is controlled to change the motor characteristics. And so, in the motor having the same source supply voltage and/or the same winding specification coil, it is possible to widely control the motor characteristics in accordance with directions and strengths of the field current by applying slightly the field current in the case where the motor characteristics at the field current of zero are made base. Therefore, one motor can be used as a low-rotation and high-torque type and as a high-rotation and low-torque type, and it is possible to achieve a motor miniaturization and reduction of current consumption, and to improve a degree of freedom in design.

Further, since it is possible to reduce the using number of magnets in order to use the control poles, it is possible to achieve much lower costs in the case of a motor using at least one expensive magnet.

Furthermore, in comparison with all-field coil type motors, the motor having high efficiency can be realized, particularly, in small output motors, because the magnets take charge of amounts corresponding to field input thereof.

In addition, in comparison with a technique of the conventional weak field, since the effective magnetic flux itself is changed in the present invention, there arises no problem of increase in losses due to iron loss at adjustment of advance thereof and the motor with high efficiency can be realized.

What is claimed is:

1. A brushless motor having a stator around which an armature coil is wound; a rotor rotatably arranged in an inside of said stator or in an outside of said stator; a rotor position detecting means for detecting a position of said rotor; and a current control means for making a current flowing into said armature coil such that a rotating magnetic field is formed between said armature coil and said rotor in accordance with a detected result of said rotor position detecting means, the brushless motor comprising:

a field magneton including a plurality of permanent magnets provided in said rotor and disposing the poles in one direction, and a plurality of control poles made of a magnetic material and arranged between said permanent magnets;

a field coil forming a closed magnetic path passing through said control poles; and a motor characteristic control means for changing a motor characteristic by controlling at least one of a direction and an amount of current flowing into said field coil, by changing a magnetic flux that said field coil generates, and by controlling an effective magnetic flux affected between said rotor and said stator.

2. A brushless motor having a stator constituted such that an armature coil is wound around a stator core having a gap at a central portion thereof; a rotor made of a magnetic material and including a bottomed cylindrical yoke rotatably arranged outside said stator; a rotor position detecting means for detecting a position of said rotor; and a current control means for making a current flowing into said armature coil such that a rotating magnetic field is formed between said armature coil and said rotor in accordance with a detected result of said rotor position detecting means, the brushless motor comprising:

a field magneton including a plurality of permanent magnets provided in said rotor and disposing the poles in one direction, and a plurality of control poles made of a magnetic material and arranged between said permanent magnets;

a rotor boss made of a magnetic material, provided at the central portion of said rotor to project along an axial direction thereof, and arranged in said gap of said stator so as to have an air gap between said stator and the rotor boss;

a field coil arranged in said stator so as to face a bottom portion of said yoke in a state of being wound in a surrounding direction of said rotor boss, and forming a closed magnetic path passing through said rotor boss, said yoke, said control poles and said stator core; and a motor characteristic control means for changing a motor characteristic by controlling at least one of a direction and an amount of current flowing into said field coil, by changing a magnetic flux that said field coil generates, and by controlling an effective magnetic flux affected between said rotor and said stator.

3. A brushless motor having a stator including a stator core around which an armature coil is wound, and a bracket which holds said stator core and is made of a magnetic material; a rotor made of a magnetic material and including a rotor core rotatably arranged inside said stator; a rotor position detecting means for detecting a position of said rotor; and a current control means for making a current flowing into said armature coil such that a rotating magnetic field is formed between said armature coil and said rotor in accordance with a detected result of said rotor position detecting means, the brushless motor comprising:

a field magneton including a plurality of permanent magnets provided in said rotor and disposing the poles in one direction, and a plurality of control poles made of a magnetic material and arranged between said permanent magnets;

a magnetic path forming member made of a magnetic material, projected from said rotor core along a diametrical direction thereof, and arranged so as to have an air gap in the space of the stator with a gap between the stator and the magnetic path forming member;

a field coil arranged in a side of said stator in a state of being wound in a surrounding direction of said rotor core, and forming a closed magnetic path passing through said rotor core, said control poles, said stator core, said bracket and said magnetic path forming member; and a motor characteristic control means for changing a motor characteristic by controlling at least one of a direction and an amount of current flowing into said field coil, by changing a magnetic flux that said field coil generates, and by controlling an effective magnetic flux affected between said rotor and said stator.

* * * * *